United States Patent [19]
von Seebach et al.

[11] Patent Number: 5,122,190
[45] Date of Patent: Jun. 16, 1992

[54] METHOD FOR PRODUCING A HYDRAULIC BINDER

[75] Inventors: Michael von Seebach; J. Bruce Tompkins, both of Houston, Tex.

[73] Assignee: Southdown, Inc., Houston, Tex.

[21] Appl. No.: 552,562

[22] Filed: Jul. 13, 1990

[51] Int. Cl.⁵ .......................... C04B 7/44; F27B 7/00
[52] U.S. Cl. ................................. 106/761; 106/758; 106/771; 432/14; 432/106; 432/108; 432/110; 432/111
[58] Field of Search .................. 106/761, 758, 771; 432/14, 106, 108, 110, 111

[56] References Cited

U.S. PATENT DOCUMENTS

| | | | |
|---|---|---|---|
| 2,409,707 | 10/1946 | Roetheli | 106/757 |
| 3,839,058 | 10/1974 | Sylvest | 106/761 |
| 3,884,620 | 5/1975 | Rammler | 432/15 |
| 3,925,091 | 12/1975 | Yoshida et al. | 432/106 |
| 4,201,546 | 5/1980 | Herchenbach et al. | 432/106 |
| 4,218,210 | 8/1980 | Herchenbach | 432/106 |
| 4,236,932 | 12/1980 | Herchenbach et al. | 106/743 |
| 4,288,213 | 9/1981 | Herchenbach et al. | 432/106 |
| 4,298,340 | 11/1981 | Herchenbach et al. | 432/58 |
| 4,299,564 | 11/1981 | Herchenbach et al. | 432/106 |
| 4,323,397 | 4/1982 | Herchenbach et al. | 432/13 |
| 4,363,668 | 12/1982 | Herchenbach | 432/106 |
| 4,381,916 | 5/1983 | Warshawsky | 106/761 |
| 4,392,890 | 7/1983 | Henin et al. | 106/761 |
| 4,507,153 | 3/1985 | Herchenbach et al. | 432/106 |
| 4,530,661 | 7/1985 | Herchenbach et al. | 432/106 |
| 4,533,396 | 8/1985 | Herchenbach et al. | 106/758 |
| 4,634,583 | 1/1987 | Wolter et al. | 432/244 |
| 4,662,945 | 5/1987 | Lawall | 106/752 |
| 4,664,625 | 5/1987 | Desmidt | 432/106 |
| 4,708,644 | 11/1987 | Lawall et al. | 432/106 |
| 4,737,191 | 4/1988 | Meynardi | 106/811 |
| 4,747,879 | 5/1988 | Wolter et al. | 432/106 |
| 4,891,007 | 1/1990 | Herchenbach et al. | 432/106 |

FOREIGN PATENT DOCUMENTS 703951 2/1954 Fed. Rep. of Germany.

OTHER PUBLICATIONS

T. W. Locher, et al., "Reaktions in Kiln Gases, Cyclic Processes of Volatile Substances, Coatings, Removal of Rings," VDZ-Congress '71, pp. 158-159.

Von H. Herchenbach, "Cust Cycles: Influences in the Air-Suspension Preheater Upon Coating, Precalcining and Partial Gas Extraction," VDZ-Congress '71, pp. 160-162.

*Primary Examiner*—Mark L. Bell
*Assistant Examiner*—Anthony J. Green
*Attorney, Agent, or Firm*—Hurt, Richardson, Garner, Todd & Cadenhead

[57] ABSTRACT

A method for producing a hydraulic binder using partially calcined raw meal entrained in the kiln off gases. The raw meal flow form the lowermost cyclone is interrupted at or near the junction of the meal chute, kiln inlet and riser duct. This flow interruption causes turbulence in the partially calcined meal facilitating dust entrainment in the gas. The splash plate can be selectively adjusted to entrain more or less raw meal. The entrained meal is drawn off from the riser duct through a kiln bypass duct, processed and hydrated to convert the calcium oxide in the meal to calcium hydroxide.

10 Claims, 2 Drawing Sheets

METHOD FOR PRODUCING A HYDRAULIC BINDER

BACKGROUND OF THE INVENTION

1. Field of the Invention

This invention relates to a method for producing a hydraulic binder using a preheater type cement clinker producing installation. Specifically, the invention includes the removal of a portion of the heated gases from the installation, in which gases is entrained a selected quantity of calcium oxide. The entrained calcium oxide is a product of the preheating finely ground of raw material in a preheating zone of the installation. The gas and entrained material are processed, separated and the calcium oxide is then slacked, or hydrated.

2. Description of the Prior Art

Hydraulic binder possessing the requisite qualities for use as a masonry mortar or plaster are commonly produced using furnaces or small kilns in which the limestone is thermally processed at temperatures between 450° C. and 900° C. These temperatures are relatively low compared to the extremely high temperatures required to produce cement clinker. In a typical cement clinker production installation utilizing a preheater tower and a rotary kiln, material temperatures of up to 1500° C. and gas temperatures of up to 2400° C. are common in the kiln. Consequently the typical furnaces required to process raw material to produce the hydraulic binder are structurally smaller and less expensive than the equipment commonly used in cement production.

Nevertheless, the furnaces or small kilns necessary to achieve temperatures of 450° C. to 900° C. require substantial capital investment. It has been recognized that it is economically and practically feasible to utilize an existing cement clinker production installation or cement plant to produce a hydraulic binder, thus eliminating the necessity of constructing and operating a separate facility for producing the hydraulic binder For example, U.S. Pat. No. 4,236,932 and U.S. Pat. No. 4,298,340, both to Herchenbach et al., disclose a method and apparatus, respectively, for producing a hydraulic binder with a preheater type cement kiln system in common use. This kiln system includes a suspension type preheater or a series of preheating cyclones contained in a preheater tower in connection with a rotary kiln. Such a kiln system using preheaters is designed to partially process and decarbonize or calcine the finely ground raw material, thereby allowing a smaller rotary kiln to be used than would otherwise be required. This lowers energy consumption, reducing both energy costs and capital investment in producing cement. In such an installation, the raw material is partially calcined or decarbonized to various degrees in the sequential preheater stages. This partially calcined raw material is suitable for use in the production of a hydraulic binder. Since cement clinker production requires that certain process conditions, such as gas and material temperatures and material quantities, be maintained, the removal of partially calcined material can adversely affect the process.

The above patents to Herchenbach teach providing removal points below various preheater cyclones for removing a portion of the processed and partially precalcined meal. This method and apparatus is claimed to be economically feasible because only a portion of the processed meal is withdrawn as a hydraulic binder, while the remaining meal is sintered in the rotary kiln for the production of cement clinker. The disadvantages of using this system include the likelihood of adversely affecting the necessary thermal conditions in the entire system by the withdrawal of the processed meal from below the lower cyclones. Further, additional capital investment is required for the retrofit of valves, material outlet lines, and the associated apparatus used therewith.

SUMMARY OF THE INVENTION

The present invention also uses a suspension preheater type kiln system in the production of the hydraulic binder. The partially calcined meal, however, is not diverted from below each cyclone. Rather, the present invention uses a method for entraining partially calcined meal in selected quantities in the kiln off gas, and removing a portion of the kiln off gas containing the calcium oxide.

In cement plants using preheaters, the finely ground and partially calcined raw material enters the inlet of the rotary kiln from the meal chute of the lowest stage preheater cyclone. Also communicating with the kiln inlet adjacent the meal chute, is a gas riser duct which feeds hot gases from the kiln into the preheater. In many cases large amounts of alkalies and chlorides are volatilized in the rotary kiln and are carried with the kiln off gases through the riser duct to the preheaters. It is common that these alkaline and chloride vapors facilitate material buildup in the riser duct, adversely affecting the cement clinker production process. In an effort to limit the material buildup, a gas bypass duct is installed branching from the riser duct to withdraw a portion of the alkaline and chloride vapors from the system, thus bypassing the preheater, to prevent their recirculation and ultimate deposit in the riser duct. Although this measure has some degree of success, in cases where large amounts of alkalies and chlorides are volatilized in the rotary kiln, material buildup may occur on the riser duct despite the removal of some gases and chloride or alkaline vapors through the bypass duct. To improve the efficiency of the alkali and chloride removal, splash plates have been installed in the kiln inlet or in the meal chute to the kiln inlets to cause a small portion of the partially calcined raw meal to be entrained in the kiln gas. Because the approximate temperature of this raw material is a relatively cold 850° C. and the hot kiln gases containing volatilized alkalies and chlorides are approximately 1050° C., the volatilized components will condense on the relatively cooler dust. This dust is then removed through the bypass system and discarded as waste. Using small amounts of pre-heated and partially calcined raw meal to host the volatile compounds results in a greater degree of chloride and alkali removal from the system than is otherwise obtained.

Using entrained raw meal to assist in alkali and chloride removal, however, itself causes additional problems, including heat loss from the system and material deposits in the riser duct. In an effort to minimize heat losses through the bypass of the preheater kiln system, the present teachings are to maintain the kiln inlet housing as clean as possible by ensuring a smooth transition of the meal chute entering the kiln inlet from the lowermost cyclone stage, and also maintaining a smooth transition between the kiln inlet or feed end housing and the rotary kiln. The conventional teaching in utilizing re-entrained raw meal to assist in alkali and chloride removal, is to minimize the quantity of entrained and pre-heated raw meal in order to avoid excess fuel consumption of the kiln system and a drop in the production capacity. This is taught, for example, by Herchenbach in "Dust Cycles: Influences In The Air Suspension Heater Upon Coating, Precalcining And Partial Gas Extraction," *Process Technology of Cement Manufacturing*, VDZ Congress 1971, pages 160-162. Typically in present systems using entrained raw meal to facilitate alkaline removal 50 to 150 grams of dust per cubic meter of gas/dust mixture is entrained. The end product is comprised of highly concentrated alkali salts and some calcium oxide. This product is not suitable for use as a hydraulic binder, and is therefore discarded.

The present invention utilizes the conventional preheater cement clinker production installation with a bypass system. However, the present invention utilizes a splash plate to cause dust to be entrained at a volume of approximately 300 to 400 grams per cubic meter of gas/dust mixture. This dust is removed through the bypass gas duct and is quenched with air in a mixing chamber. The entrained mixture is then cooled in a heat exchanger or conditioning tower sufficient to be separated in a dust collector. The material is separated and slacked with water to complete the production of the hydraulic binder.

Accordingly, it is an object of the present invention to provide a method for producing a hydraulic binder which is efficient and cost effective in its operation.

Another object of the present invention is to provide a method for producing a hydraulic binder which utilizes presently operating preheater-type cement clinker production installations.

Another object of the present invention is to provide a method for producing a hydraulic binder in a cement production installation without adversely affecting the cement production process and utilizing the bypass dust as a hydraulic binder instead of wasting this dust.

Other objects, features, and advantages of the present invention will be apparent from the following description when taken in conjunction with the accompanying drawings wherein like characters of reference designate corresponding parts throughout the several views.

DESCRIPTION OF THE PREFERRED EMBODIMENTS

Figure 1:
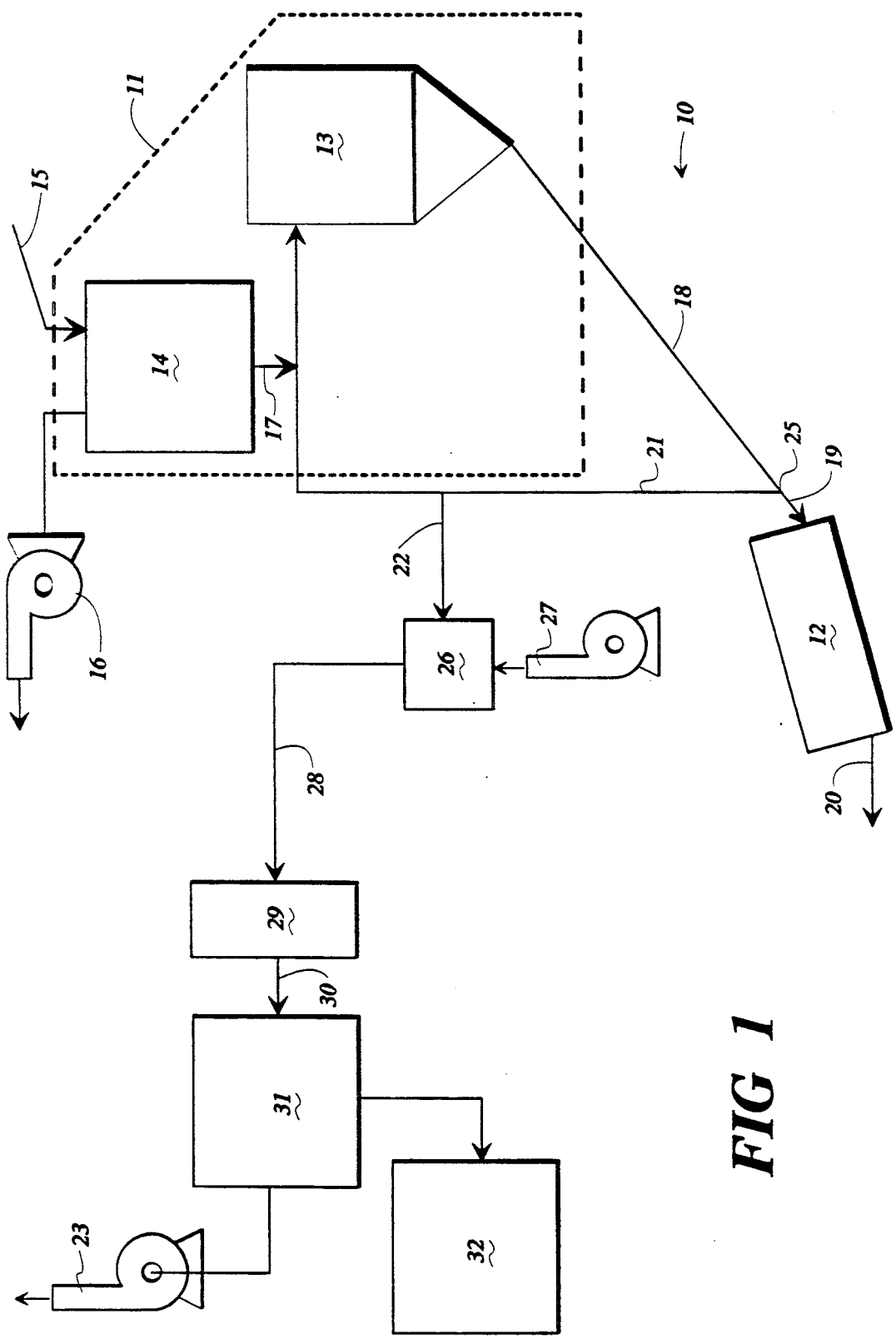
FIG. 1 is a schematic representation of the present invention.
Figure 2:
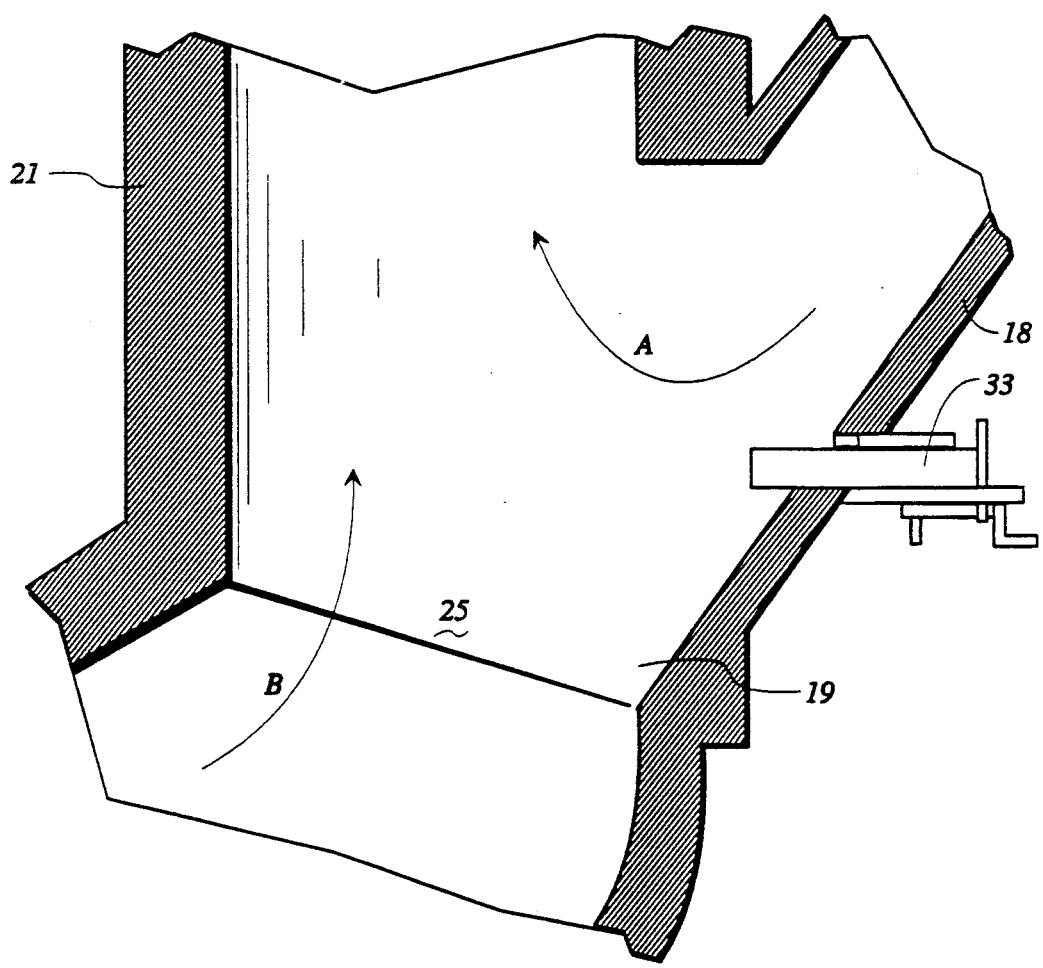
FIG. 2 is a schematic side view of a splash plate and partial fragmentary view of a kiln system of the present invention.

Referring to FIG. 1 wherein like reference numerals designate identical corresponding parts, numeral 10 designates a cement clinker producing installation having a suspension type preheater 11 and a rotary kiln 12. The suspension type preheater 11 includes lowermost stage cyclone 13 and one or more preheater cyclones 14 disposed above lowermost cyclone 13. Inlet line 15 introduces raw meal such as a mixture of finely ground clay and limestone into the upper stages of the preheaters 14, usually between the first and second stage cyclones in, for example, a four stage preheater. Simultaneously, induced draft fan 16 pulls hot gases upwardly through preheater 11 from kiln 12, exhausting these gases to a filter (not shown). Numeral 17 schematically represents the ducts between the upper stage cyclones 14 and the lowermost cyclone 13. It is understood that while partially calcined raw meal is processed through the upper cyclones 14 and is directed downwardly to lowermost cyclone 13, as indicated by the arrow on line 17, simultaneously hot gases are delivered upwardly from cyclone 13 to the upper cyclones 14. Partially calcined meal, is delivered from cyclone 13 through meal chute 18 and into kiln inlet 19. Thereafter the meal is delivered into kiln 12 where it is further calcined and sintered, exiting kiln 12 through outlet 20 to a clinker cooler (not shown). At the juncture of meal chute 18 and kiln inlet 19 is gas riser duct 21, which connects kiln inlet 19 and cyclone 13, delivering hot gases from kiln 12 to preheaters 13 and 14 of preheater 11.

Bypass gas duct 22 connects to riser duct 21 above the junction of riser duct 21 and kiln inlet 19. As is discussed hereinafter in further detail, blower 23 applies a negative pressure to bypass gas duct 22, removing hot gases and the material entrained therein from riser duct 21 through bypass gas duct 22.

As is commonly known in the art, the raw material introduced through inlet line 15 is incrementally, partially calcined in upper cyclones 14 and thereafter in lowermost cyclone 13. The now partially processed meal is fed through meal chute 18 and into kiln inlet 19. At the junction 25 of meal chute 18, kiln inlet 19 and riser duct 21 is a means for interrupting the flow of meal from chute 18 into inlet 19. This means is usually a gate 33 which can be disposed to a selective extent into meal chute 18, and is commonly referred to as a splash plate. The structure of splash plates are generally well-known in the art and are used to interrupt meal flow, causing turbulence in the meal flow and creating a small amount of dust entrained in the kiln off gases rising through riser duct 21. Arrow A represents fine particles of partially calcined meal dust entrained in the kiln off gases, represented by Arrow B. The method of the present invention requires adjusting the splash plate so as to interrupt the meal flow to such an extent that the kiln off gases in the bypass duct are comprised of 250 to 400 grams of processed meal per cubic meter gas/dust mixture. While other means known in the art could be utilized to interrupt meal flow instead of using a splash plate, meal flow ideally should be interrupted so that a minimum of 250 grams per cubic meter is entrained.

In kiln inlet 19 and riser duct 21, the entrained dust contacts the alkaline and chlorine vapors in the kiln off gases. The alkaline and chlorine components then condense on the relatively cooler entrained dust particles. Approximately 10% to 30% of the kiln off gases are extracted through bypass gas duct 22 from riser duct 21. With the kiln off gases removed from riser duct 21 is the entrained meal and condensed alkalies and chlorine. The gas and dust is exhausted by blower 23 through bypass duct 22, and then enters bypass mixing chamber 26 where these components are quenched by air from blower 27. In mixing chamber 26 the dust and gases are cooled to approximately 500° C. to 700° C. and the alkalies are condensed. This quenched gas and dust mixture is pulled through duct 28 and into a heat exchanger or conditioning tower 29 which further cools the gas and dust to approximately 250° C. to 350° C. The dust passes through duct 30 and into dust collector 31 where it is separated from the kiln bypass gases which are removed through blower 23, and is collected.

This product is then transported to a conventional lime slacking device where it is slacked with water, converting the calcium oxide into calcium hydroxide.

The resulting hydraulic binder will have a constituent of soluble alkali salts which will affect the quality of the end product hydraulic binder, depending on the amount of alkali salts present. Therefore, the process must be controlled considering the quality requirements of the end product. As described above, the quantity of meal entrained in riser duct 21 is dependent upon the adjustment of the splash plate or otherwise upon the interruption of meal flow. Increased interruption of meal flow will increase the quantity of meal flow entrained in the kiln off gases, thereby increasing the amount of calcium oxide relative to the amount of soluble alkali salt contained in the end product. Therefore the quality requirements of the hydraulic binder will determine the amount of pre-heated raw meal which can be entrained in the kiln off gases in riser duct 21, from which it is pulled into the bypass.

It will be further obvious to those skilled in the art that many variations may be made in the above embodiments here chosen for the purpose of illustrating the present invention, and full result may be had to the doctrine of equivalents without departing from the scope of the present invention, as defined by the appended claims.

What is claimed is:

1. A method for producing a hydraulic binder using a cement clinker production facility of the type having a rotary kiln fed by one or more preheater stages, comprising the steps of:
   (a) introducing ground raw cement meal into the preheater stage of the cement clinker production facility for movement along a path of travel;
   (b) directing gas from the rotary kiln against the raw meal, the raw meal being thereby pre-heated and partially calcined;
   (c) creating a mixture of the gas from the rotary kiln and pre-heated raw meal by entraining a portion of the pre-heated raw meal in the gas;
   (d) directing a bypass portion of the mixture into a bypass system;
   (e) separating the gas in the bypass portion of the mixture from the raw meal; and
   (f) hydrating the raw meal to form the hydraulic binder.

2. The method defined in claim 1 further comprising the steps of quenching the bypass portion of the mixture and then directing the bypass portion of the mixture into a collection zone.

3. The method defined in claim 2 wherein the step of quenching comprises combining air with the bypass portion of the mixture.

4. The method defined in claim 1 further comprising the steps of directing the bypass portion of the mixture into a conditioning tower and then directing the bypass portion of the mixture into a collection zone.

5. The method defined in claim 1 wherein the step of introducing raw meal comprises introducing calcium carbonate.

6. The method defined in claim 1, wherein carbon dioxide is liberated from the raw meal when gas from the rotary kiln is directed against the raw meal.

7. The method defined in claim 1 further comprising the step of disposing a plate means in the path of travel for interrupting movement of the raw meal.

8. The method defined in claim 1 wherein the step of creating a mixture comprises passing the raw meal over a splash plate thereby causing the raw meal to be entrained in the gas.

9. The method defined in claim 1 further comprising the step of controlling the quantity of raw meal in the mixture by selectively interrupting the movement of the raw meal along the path of travel.

10. The method defined in claim 1, wherein the raw meal entrained in the mixture is comprised of between 35% and 85% of calcium oxide.

* * * * *